United States Patent
Park et al.

(10) Patent No.: US 10,459,715 B2
(45) Date of Patent: Oct. 29, 2019

(54) PATCHING BOOT DATA UTILIZING ONE-TIME PROGRAMMABLE MEMORY AND COPY PATCH CODE INSTRUCTIONS

(71) Applicant: Samsung Electronics Co., Ltd., Suwon-si (KR)

(72) Inventors: Sang Uk Park, Seoul (KR); Bong Chun Kang, Suwon-si (KR); Cheong Woo Lee, Suwon-si (KR); Hee Dong Shin, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/658,976

(22) Filed: Jul. 25, 2017

(65) Prior Publication Data

US 2018/0217834 A1   Aug. 2, 2018

(30) Foreign Application Priority Data

Feb. 1, 2017   (KR) .................. 10-2017-0014216

(51) Int. Cl.
*G06F 8/65*   (2018.01)
*G06F 3/06*   (2006.01)
*G06F 9/4401*   (2018.01)
*G06F 8/654*   (2018.01)

(52) U.S. Cl.
CPC .............. *G06F 8/66* (2013.01); *G06F 3/065* (2013.01); *G06F 3/0619* (2013.01); *G06F 3/0679* (2013.01); *G06F 8/654* (2018.02); *G06F 9/4401* (2013.01)

(58) Field of Classification Search
CPC .......... G06F 8/66; G06F 8/654; G06F 3/0619; G06F 3/065; G06F 3/0679; G06F 9/4401
USPC ......................................................... 711/103
See application file for complete search history.

(56) References Cited

U.S. PATENT DOCUMENTS

| | | | |
|---|---|---|---|
| 6,260,157 B1 * | 7/2001 | Schurecht | G06F 8/66 711/202 |
| 9,142,317 B2 | 9/2015 | Lee et al. | |
| 9,348,730 B2 | 5/2016 | Odlivak et al. | |
| 9,395,975 B2 | 7/2016 | Bar-Or | |
| 2005/0030796 A1 * | 2/2005 | Saado | G06F 8/66 365/189.07 |
| 2006/0265692 A1 * | 11/2006 | Su | G06F 8/66 717/124 |
| 2007/0083713 A1 * | 4/2007 | Torrini | G06F 9/268 711/125 |
| 2007/0113064 A1 * | 5/2007 | Wei | G06F 21/575 713/1 |
| 2009/0031103 A1 | 1/2009 | Henry et al. | |

(Continued)

*Primary Examiner* — Yaima Rigol
(74) *Attorney, Agent, or Firm* — Onello & Mello, LLP

(57) ABSTRACT

A semiconductor system comprises a nonvolatile memory storing a patch code, the patch code comprising a unique identifier (ID). An internal read only memory (IROM) stores a boot code, the boot code comprising a patch code execution function for executing the patch code and a linked register (LR) address for specifying a storage location where the patch code is to be executed. A static random access memory (SRAM) stores a copy of the patch code at the storage location, the copy of the patch code including the unique ID. A processor executes the copy of the patch code from the storage location. The processor executes the copy of the patch code stored at the storage location in the SRAM according to the comparison result.

20 Claims, 4 Drawing Sheets

(56) References Cited

U.S. PATENT DOCUMENTS

| | | | |
|---|---|---|---|
| 2009/0271593 A1* | 10/2009 | Hsu | G06F 8/66 |
| | | | 712/226 |
| 2010/0106953 A1 | 4/2010 | Morad et al. | |
| 2011/0107070 A1 | 5/2011 | Barbulescu et al. | |
| 2011/0252413 A1* | 10/2011 | Maeda | G06F 8/66 |
| | | | 717/168 |
| 2014/0149643 A1* | 5/2014 | Devinoy | G06F 8/66 |
| | | | 711/103 |
| 2014/0244991 A1* | 8/2014 | Akdemir | G06F 8/66 |
| | | | 713/2 |
| 2014/0281165 A1* | 9/2014 | Moschopoulos | G06F 3/0619 |
| | | | 711/103 |
| 2015/0067313 A1* | 3/2015 | Zaidi | G06F 21/572 |
| | | | 713/2 |
| 2015/0242213 A1 | 8/2015 | Li et al. | |
| 2015/0277894 A1 | 10/2015 | Pirvu et al. | |

* cited by examiner

PATCHING BOOT DATA UTILIZING ONE-TIME PROGRAMMABLE MEMORY AND COPY PATCH CODE INSTRUCTIONS

CROSS-REFERENCE TO RELATED APPLICATION

This U.S non-provisional application claims priority from Korean Patent Application No. 10-2017-0014216 filed on Feb. 1, 2017 in the Korean Intellectual Property Office, and all the benefits accruing therefrom under 35 U.S.C. 119, the disclosure of which in its entirety is herein incorporated by reference.

BACKGROUND

1. Technical Field

The present disclosure relates to a semiconductor system and a method for operating a semiconductor device associated with the semiconductor system.

2. Description of the Related Art

A variety of problems may occur during a booting process of an electronic system including a semiconductor system, for example, a system employing an application processor (AP). If it is determined that a problem associated with a boot code of an internal read-only memory (IROM) is present, for example a problem associated with the booting process, re-manufacture of the IROM can be time consuming and costly. For example, the code simulation and verification process for addressing a boot code problem, and remanufacture of an IROM based on the modified boot code can consume resources. Further, costs and resources are additionally consumed when modifying a mask Read-Only Memory (ROM) for manufacturing the IROM.

SUMMARY

Aspects of the present disclosure provide a semiconductor system capable of saving time and cost while altering the operation of a boot code of an IROM.

In some embodiments of the present disclosure there is provided a method for operating a semiconductor system capable of saving time and cost while solving a problem associated with a boot code of an IROM.

However, aspects of the present disclosure are not restricted to the those set forth herein and there are many additional embodiments that one of ordinary skill in the art would appreciate. The various aspects of the present disclosure will become more apparent to one of ordinary skill in the art to which the present embodiment pertains by referencing the specification, claims, and drawings herewith.

According to an aspect of the present disclosure, there is provided a semiconductor system comprising a nonvolatile memory storing a patch code, the patch code including a unique identifier (ID), an internal read only memory (IROM) storing a boot code, the boot code including a patch code execution function for executing the patch code and a linked register (LR) address, which specifies a storage location where the patch code is to be executed, a static random access memory (SRAM) storing a copy of the patch code at the storage location, the copy of the patch code includes a unique ID, and a processor executing the copy of the patch code from the storage location, wherein the patch code execution function uses a comparison to compare the unique ID of the patch code stored in the nonvolatile memory with the LR address provided from the boot code when the patch code execution function is executed, and wherein the processor executes the copy of the patch code stored at the storage location in the SRAM according to the comparison result.

According to another aspect of the present disclosure, there is provided a semiconductor system comprising a nonvolatile memory storing a patch code, the patch code comprises a unique identifier ID, an internal read only memory (IROM) storing a boot code, the boot code comprising a patch code execution function for executing the patch code and a linked register (LR) address for specifying a storage location where the patch code is to be executed, and a processor, wherein the patch code execution function compares the unique ID of the patch code stored in the nonvolatile memory with the LR address provided from the boot code when the patch code execution function is executed, and wherein the processor executes the patch code according to the comparison result.

According to still another aspect of the present disclosure, there is provided a method for operating a semiconductor system including providing a nonvolatile memory storing a patch code comprising a unique identifier (ID), providing an internal read only memory (IROM) storing a boot code, the boot code including a patch code execution function for executing the patch code and a linked register (LR) address for specifying a storage location from where the patch code is to be executed; providing a static random access memory (SRAM) storing a copy of the patch code at the storage location, the copy of the patch code including the unique ID, comparing the unique ID of the patch code stored in the nonvolatile memory with the LR address provided from the boot code when the patch code execution function is executed, and executing the copy of the patch code stored in the SRAM according to the comparison result.

According to still another aspect of the present disclosure, there is provided a method for operating a semiconductor system. The method comprises providing a nonvolatile memory in which a patch code is stored, the patch code including a unique identifier (ID). An internal read only memory stores a boot code including a patch code execution function for executing the patch code and further storing a linked register address that specifies a storage location from which the patch code is to be executed. A copy of the patch code is stored at the storage location in a random access memory, the copy of the patch code including the unique ID. The copy of the patch code stored at the storage location is executed in response to a comparison of the unique ID and the linked register address.

BRIEF DESCRIPTION OF THE DRAWINGS

These and other aspects and features of the present disclosure will become apparent by describing in detail example embodiments thereof, with reference to the attached drawings, in which.

DETAILED DESCRIPTION OF EMBODIMENTS

Figure 1:
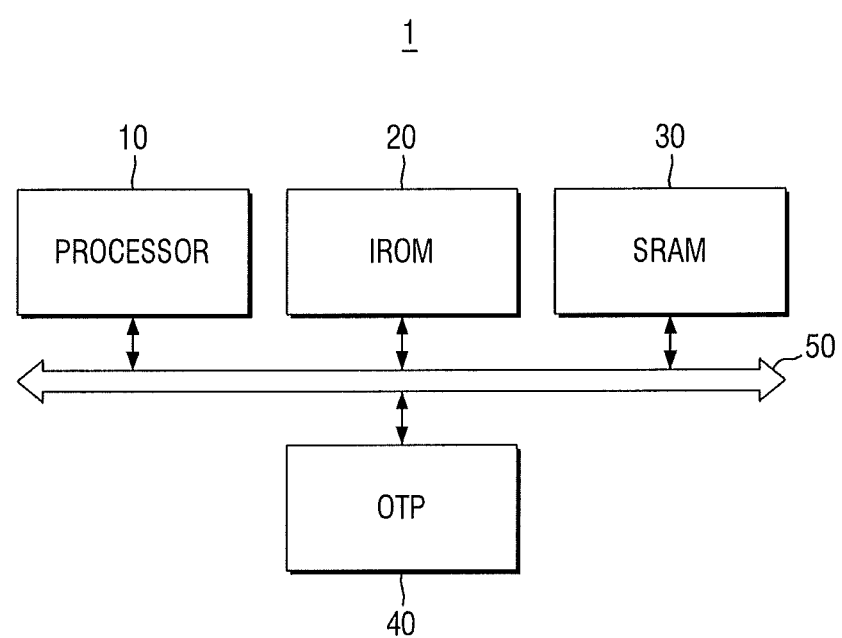
FIG. 1 is a schematic diagram illustrating a semiconductor system according to some embodiments of the present disclosure.

FIG. 1 is a schematic diagram illustrating a semiconductor system according to some embodiments of the present disclosure.

Referring to FIG. 1, a semiconductor system 1 according to some embodiments of the present disclosure includes a processor 10, an internal read-only memory (IROM) 20, a static random access memory (SRAM) 30, and a one-time programmable memory (OTP) 40. The processor 10, the IROM 20, the SRAM 30 and the OTP 40 can exchange data, addresses and commands with each other along a bus 50.

The processor 10 is configured to execute a program code for controlling the semiconductor system 1. In some embodiments of the present disclosure, the processor 10 may include a central processing unit (CPU), a graphic processing unit (GPU), an application processor (AP), a digital signal processor (DSP) and other types of processors as known to one of ordinary skill in the art. The scope of the present disclosure is not limited to these types of processors, which are listed here as example types of processors.

The IROM 20 includes a program code stored therein. The program code can be utilized during the operation of the semiconductor system 1. In general, the program code resident in the IROM remains static and is not changed during the operation. In the present disclosure the IROM is utilized for operational purposes. For example, the IROM 20, as disclosed, may include a program code, also known as a boot code, relating to a booting procedure of the semiconductor system 1. The IROM 20 generally cannot have its contents modified upon having been manufactured into a product.

The SRAM 30, as shown, is of example of a location at which data such as program codes executed by the processor 10 can be stored during operation. The contents of the SRAM can be varied, for example as a result read/write/command instructions executed by the processor 10 during operation. Although the SRAM 30 is illustrated in the present embodiment, the scope of the present disclosure is not limited thereto, and for example, a dynamic random access memory (DRAM) may be used in its place or other storage device that permits reading and writing of electronic data.

The OTP 40 is a memory device which can be programmed only a single time such that data values stored therein cannot be changed once data is written thereto. In this embodiment, the OTP 40 device is illustrated, but the scope of the present disclosure is not limited thereto. It is apparent to those of ordinary skill in the art that various types of nonvolatile memory devices may be used as an OTP device 40.

When a problem or an error occurs during the booting process of the processor 10, there can be various causes for this. However, if the cause of the problem is found in the boot code stored in the IROM 20, it can be time-consuming and costly to modify the boot code of the IROM 20, since the code/data stored in the IROM cannot be changed during operation. To correct or modify the code/data stored in the IROM it is necessary to prepare the modified boot code, to perform a simulation to verify the modified boot code, to manufacture an updated mask Read-Only Memory (ROM) that reflects the verified boot code, and to manufacture an IROM using the updated mask ROM. This process can ordinarily requires a great deal of time and cost for the manufacturer.

Embodiments of the present inventive concepts address these limitations. For example, in overcoming this time-consuming and costly drawback, according to the embodiments of the present disclosure described herein, a patch code is executed. Execution of a patch code in this manner prevents failures that otherwise would occur due to a defect in the boot code without having to directly modify the IROM 20. In particular, according to some of the embodiments of the present disclosure, it is possible to execute a patch code capable of performing a desired operation desired by a user, while maintaining relative simplicity in the complexity of the boot code.

Figure 2:
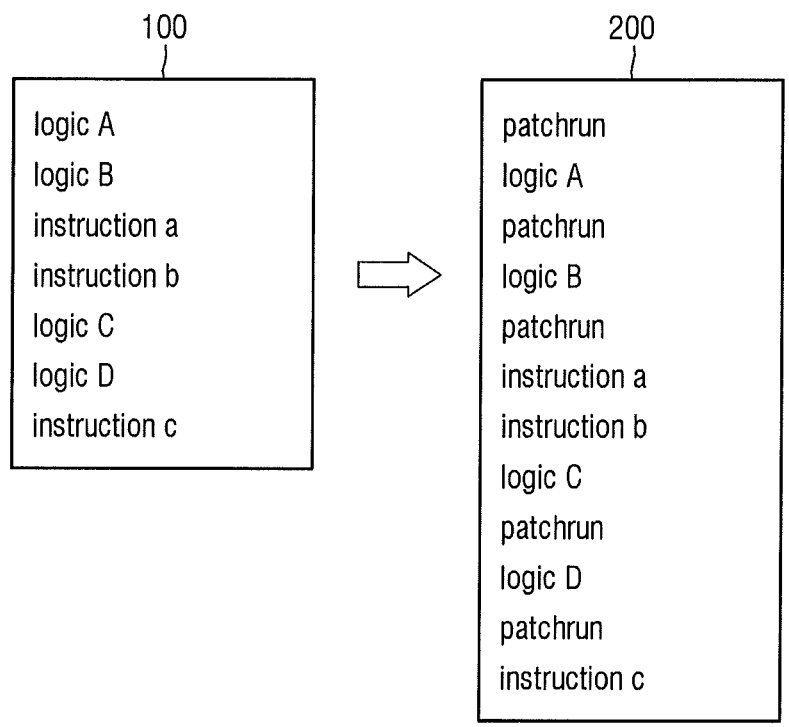
FIG. 2 is a schematic diagram representing a boot code used in a semiconductor system according to some embodiments of the present disclosure.

FIG. 2 is a schematic diagram representing a boot code used in a semiconductor system according to some embodiments of the present disclosure.

Referring to FIG. 2, a conventional boot code 100 and an inventive boot code 200 configured in accordance with the present inventive concepts, are illustrated. As described herein, the inventive boot code 200 can be utilized in the semiconductor system 1 according to embodiments of the present disclosure.

When referring to logic operations and instructions in the boot codes 100, 200 herein, logic operations are indicated through representation of capital letters, A, B, C, D, . . . , etc., while instructions are indicated through representation of lower case letters, a, b, c, d, . . . etc.

According to the conventional boot code 100, logic operation A, logic operation B, instruction a, instruction b, logic operation C, logic operation D and instruction c are sequentially executed. Here, the logic refers to a code for performing a series of operations including a plurality of instructions in a certain logic order.

In the case of the boot code, 200, as presently disclosed, one or more patch code execution functions (patchrun) can be inserted between certain code operations in the boot code. For example, patch code execution functions (patch run) can be inserted between operations logic operation A, logic operation B, instruction a, instruction b, logic operation C, logic operation D, and instruction c. In some embodiments, the patch code execution function (patchrun) receives a linked register (LR) address, which is a return address for returning after executing the patch code execution function, from the boot code 200. That is, the LR address makes it possible to specify the location in the boot code 200, where the patch code is to be executed. In some embodiments of the present disclosure, a linked register (LR) may be a register that stores a return address in a processor executing the program when a function (sub-routine) is called during execution of a program.

It should be noted that the LR addresses received by the patch code execution functions (patchrun) from the boot code 200 can optionally be set differently. For example, depending on various conditions that may occur on the boot code of the IROM 20, various patch codes can be executed at appropriate places to overcome the conditions that may be at issue with the boot code 200.

For example, if there is a task to be processed in advance before logic operation A is executed, the task may be executed by calling the patch code execution function (patchrun) prior to executing logic operation A. In this case, the LR address received by the patch code execution function (patchrun) may include an address at which logic operation A starts. Thus, after execution of the patch code execution function (patchrun) is completed, logic operation A can be executed. In some embodiments there may be a certain order or a sequence that the patchrun occurs, after certain logic operations (A, B, C, or D) are performed.

As another example, if it becomes desired that logic operation B is to be replaced by another logic operation E, for example, as a result of a determination that logic operation B contains a serious error, logic operation E may be executed instead of logic operation B by calling the patch code execution function (patchrun) before executing logic operation B. In this case, the LR address received by the patch code execution function (patchrun) may include an address following logic operation B, for example, an address of instruction a. Accordingly, the execution of logic operation B may be properly omitted after the execution of the patch code execution function (patchrun) is completed, and the execution of logic operation E can be called upon to take the place of logic operation B. This example illustrates an embodiment where the patchrun can be performed to prevent the operation of an erroneous logic operation, i.e., logic operation B, from occurring.

In another example embodiment, a patchrun operation may be employed to insert an optional delay operation between logic operation C and logic operation D. Particularly in the case of an analog circuit, in order to stably determine the values at the nodes of the circuit, a time difference due to circuit characteristics such as a propagation delay, a time difference due to circuit elements and design characteristics at times, or other timing related characteristics known to one of ordinary skill in the art, can be considered. To this end, it is possible to cause a delay logic to be executed between logic operation C and logic operation D by calling the patch code execution function (patchrun) before executing logic operation D after executing logic operation C. In this case, the LR address received by the patch code execution function (patchrun) may include an address of logic operation D. Accordingly, after the execution of logic operation C is completed, a delay can be caused to occur, with the length of the delay being defined by the patch code execution function (patchrun). Following the delay operation, the execution of logic operation D can be initiated.

In another example embodiment, it may be desired that the order of execution of logic operation A and logic operation B be changed. To this end, logic operation B can be first executed by calling a patch code execution function (patchrun) having the LR address including an address of logic operation B before execution of logic operation A. In this example, then, following execution of logic operation B, logic operation A may be executed by calling the patch code execution function (patchrun) having the LR address including an address of logic operation A. In such a case, appropriate code will be inserted to ensure that the program operation does not fall into an infinite loop as a result of execution of the patch code.

Accordingly, the patch code execution function (patchrun), allows for the possibility to execute a patch code that can perform any of a number of operations desired by the user, while keeping the complexity of the boot code relatively simple. This allows for multiple variations fitting a wide variety of needs for the semiconductor system, and allows for certain flexibility in later modification of the system following initial manufacture.

Figure 3:
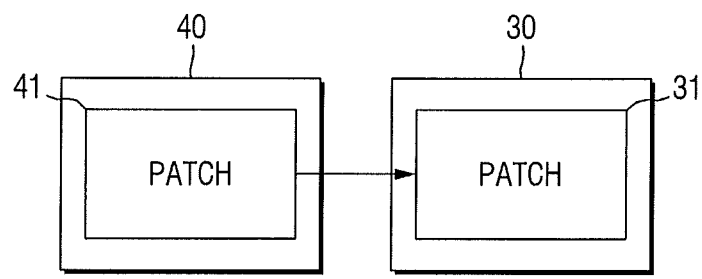
FIG. 3 is a schematic diagram representing an example of an operation of a semiconductor system according to some embodiments of the present disclosure.

FIG. 3 is a schematic diagram representing an example of an operation of a semiconductor system according to some embodiments of the present disclosure.

Referring to FIG. 3, the OTP 40 can be configured to store a patch code 41. In other words, the patch code 41 can be programmed into the OTP 40, the OTP 40 in turn sharing the bus 50 with the IROM 20, processor 10, and SRAM 30. In some embodiments, the patch code 41 can include a unique identification value (ID), for a purpose that is to be determined. In some embodiments of the present disclosure, the unique ID may include an address value that is the same as the LR address described herein.

In some embodiments of the present disclosure, the OTP 40 may store the patch code itself as it is. Specifically, the OTP 40 may include a patch code operation that can be selectively executed according to the type of a failure that may occur during a booting operation as in a conventional case failure. However, in some embodiments, the OTP 40 may include the patch code itself including arbitrary instructions desired by the user regardless of the type of a failure that may occur during booting. For example, a self-contained operation may be programmed and called upon to cause replacement of a particular logic operation (A, B, C, D), the re-ordering of logic operations (A< >B), a delay operation, and the like, as described herein. Such patch code operations, allows an OTP to remain useful after it is programmed, as the patchruns can later be accessed, even if not called upon until a later time in the lifetime of the system 1. In some cases, when a failure occurs, it can possible to overcome the failure if it corresponds to a specific type of failure. In some cases, it is possible to make patch code operations available in order to later provide a solution to cope with any type of failure at a variety of different processing points during the booting operation.

The SRAM 30 can be configured to store a copy 31 of the patch code, for example at a certain address. In some embodiments, since the SRAM 30 stores the copy 31 of the patch code stored in the OTP 40, the copy 31 of the patch code stored in the SRAM 30 also includes a unique ID having the same value as the unique ID of the OTP 40. In some example embodiments, the unique ID may be represented by a data value, for example, a data value of '0'.

The patch code 41 stored in the OTP 40 may be copied to the SRAM 30 at the booting stage of the semiconductor system 1. This situation is a case where the patch code is executed through the SRAM 30.

Alternatively, if the unique ID of the patch code 41 stored in the OTP 40 is '0', the patch code 41 is not copied to the SRAM 30, and '0' may be recorded in the unique ID area of the SRAM 30. For example, if booting operation proceeds as planned, with no need for a patch code, a '0' may be recorded. In this case, it is determined that the patch code is not executed during the execution of the boot code present in the IROM 20. On the other hand, when another unique ID value of the patch code is present, for example, a data value of '1', the patch code can be made to be executed.

In the present embodiment, for simplicity of description, '0' is recorded as the unique ID in order not to execute the patch code, but the scope of the present disclosure is not limited thereto. It is obvious to those of ordinary skill in the art that the value associated with non-performance of the patch code can be a value other than '0', for example, a value of '1' or some value other than '1' or '0'.

In some embodiments of the present disclosure, the SRAM 30 may be configured or otherwise programmed to additionally store a return instruction (RET instruction) as the next instruction to be performed following the performance of instructions contained in the copy 31 of the patch code.

Figure 4:
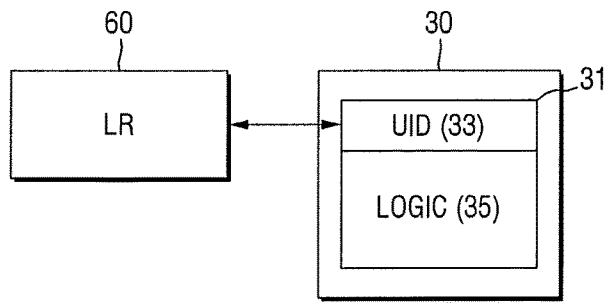
FIG. 4 is a schematic diagram representing an example of an operation of a semiconductor system according to some embodiments of the present disclosure.

FIG. 4 is a schematic diagram representing an example of an operation of a semiconductor system according to embodiments of the present disclosure.

Referring to FIG. 4, in a case where the unique ID 33 of the copy 31 of the patch code contained in the SRAM 30 is '0', the processor 10 (see FIG. 1) responds by not executing the patch code. In such as case, the booting process is considered to be operating correctly.

In the present embodiment, for simplicity of description, a unique ID data value of '0' is determined to be associated with non-execution of the patch code, but the scope of the present disclosure is not limited thereto. It is obvious to those of ordinary skill in the art that the non-execution value can be varied to a value other than '0'.

In the present embodiment, the processor 10 executes a logic portion 35 of the patch code if it is determined that the unique ID 33 of the copy 31 of the patch code stored in the SRAM 30 is identical to an LR address 60 provided by the boot code 200 when the patch code execution function is utilized. Such logic operations are in place to correct the defects that occur in the booting process.

Here, the LR address 60 can be automatically determined in the system when the patch code execution function is called according to the architecture adopted by the semiconductor system.

On the other hand, the processor 10 can be configured to not execute the logic portion 35 of the patch code if it is determined that the unique ID 33 of the copy 31 of the patch code stored in the SRAM 30 is distinct from the LR address 60 provided from the boot code 200 when the patch code execution function is executed.

In this embodiment, as illustrated herein, the copy 31 of the patch code stored in the SRAM 30 is executed in response to a comparison of the unique ID 33 stored in the SRAM 30 with the LR address 60 of the patch code execution function. It is apparent that the scope of the present disclosure is not limited thereto as understood by one of ordinary skill in the art.

In some embodiments of the present disclosure, the patch code 41 stored in the OTP 40 may be executed in response to a comparison of the unique ID stored in the OTP 40 with the LR address 60 of the patch code execution function.

In such a case, the processor 10 responds by not executing the patch code if the unique ID of the patch code 41 of the OTP 40 is '0'.

In the present embodiment, for simplicity of description, '0' is determined as the unique ID associated with non-execution of the patch code, however, the scope of the present disclosure is not limited thereto. It is apparent to one of ordinary skill in the art that the value associated with non-execution of the patch code can be determined as a value other than '0', such as '1', or some other value.

The processor 10 responds by executing a logic portion of the patch code 41 if the unique ID of the patch code 41 stored in the OTP 40 is identical to the LR address 60 provided from the boot code 200 when the patch code execution function is executed.

On the other hand, the processor 10 can respond by not executing the logic portion of the patch code 41, in a case where the unique ID of the patch code 41 stored in the OTP 40 is different from the LR address 60 provided from the boot code 200 when the patch code execution function is executed.

Referring again to FIG. 2, a case where the order of execution of logic operation A and logic operation B is to be changed or altered to meet the needs of the booting process will be described.

The unique ID of the patch code 41 is stored in the OTP 40. The patch code 41 stored in the OTP 40 is copied to the SRAM 30 and then used for comparison with the LR address provided from the boot code 200 at a time when the patch code execution function (patchrun) called prior to the execution of logic operation A is executed. If the patch code execution function (patchrun) called before executing logic operation A is executed and the unique ID 33 of the SRAM 30 is identical to the LR address, the copy 31 (specifically, the logic portion 35) of the patch code stored in the SRAM 30 is executed.

The copy 31 of the patch code stored in the SRAM 30 changes the unique ID 33 to enable the patch code to be executed by the patch code execution function (patchrun) called after execution of logic operation B, and jumps such that logic operation B can be executed immediately, in advance of execution of logic operation A.

Following the execution of logic operation B, when the LR address received by the patch code execution function (patchrun) called again after the execution of logic operation B from the boot code 200 is identical to the unique ID 33 of the SRAM 30 so that the copy 31 (specifically the logic portion 35) of the patch code is executed, logic operation A may be called from the patch code and executed. Following that, instruction a may be executed according to the operation of the boot code.

Figure 5:
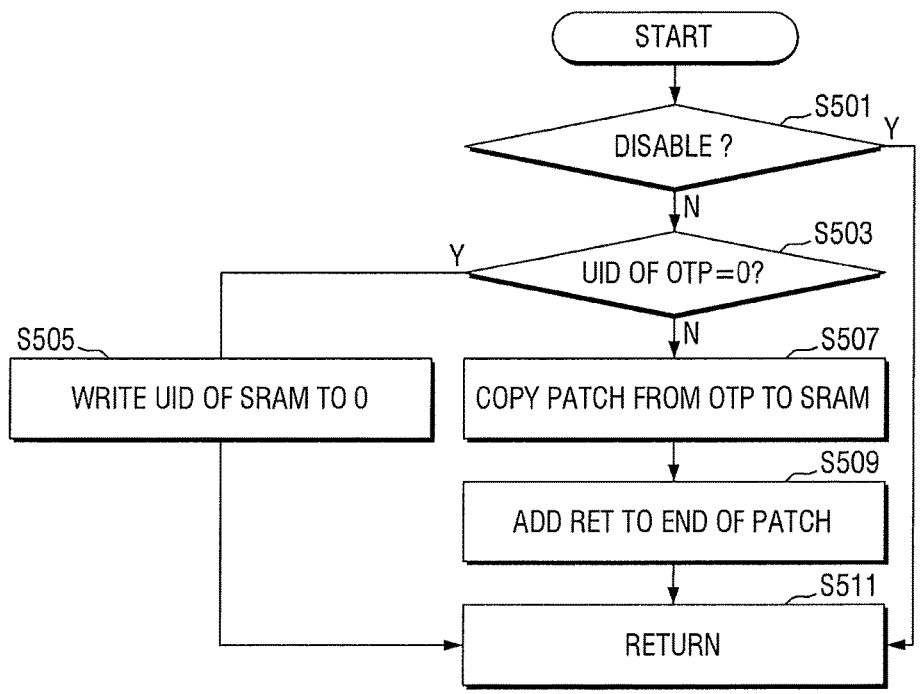
FIG. 5 is a flowchart illustrating a method of operating a semiconductor device according to some embodiments of the present disclosure.

FIG. 5 is a flowchart illustrating a method for operating a semiconductor device according to some embodiments of the present disclosure.

Referring to FIG. 5, a method for operating a semiconductor device according to some embodiments of the present disclosure may include the following steps. While the steps as shown depict a particular order for the purpose of illustration, the ordering of the steps is not limited thereto and may take other orders.

In this embodiment, steps S501 to S511 illustrate initialization steps.

In this embodiment, the capital letter S, represents the term step, for example S501 represents step 501. Also, the letters Y and N represent Yes and No answers to the decision steps, respectively.

In step S501, it is determined whether to use the patch code execution function for executing and employing in the semiconductor system. If the patch code execution function is disabled in the semiconductor system 1 (Y in S501), the process returns (S511).

On the other hand, in a case where the patch code execution function is enabled in the semiconductor system 1 (S501, N), the process proceeds to step S503. At step 503 it is determined whether the unique ID (UID) of the OTP 40 is '0'.

In a case where the unique ID UID corresponds to '0' (Y in S503), the unique ID of the SRAM 30 is also recorded as '0' in step S505 and then the process returns (S511).

On the other hand, if the unique ID does not correspond to '0' (N in S503), the patch code is copied from the OTP 40 to the SRAM 30 in step S507.

In some of the present embodiments, for simplicity of description, '0' is recorded as the unique ID in order to correspond to non-execution of the patch code. However, as stated herein, the scope of the present disclosure is not limited thereto. It is apparent to those of ordinary skill in the art that the value associated with non-execution can be changed to a value other than '0', for example, '1', or some other suitable value.

Thereafter, in step 509 (S509), a return instruction (RET instruction) is additionally stored following the copy 31 of the patch code. After this, the process returns (S511).

In summary, it is first determined whether the patch code is enabled or disabled. If the patch code is disabled, the program returns. If the patch code is enabled, it is determined whether the unique ID is equal to a predetermined value, e.g., '0'. If equal to '0' the unique ID of the SRAM is written to '0' and the program returns.

If the unique ID of the OTP is not equal to the predetermined value of '0' then the patch code is copied from the OTP to SRAM. In some embodiments, a return instruction RET can be added to the end of the patch code.

Figure 6:
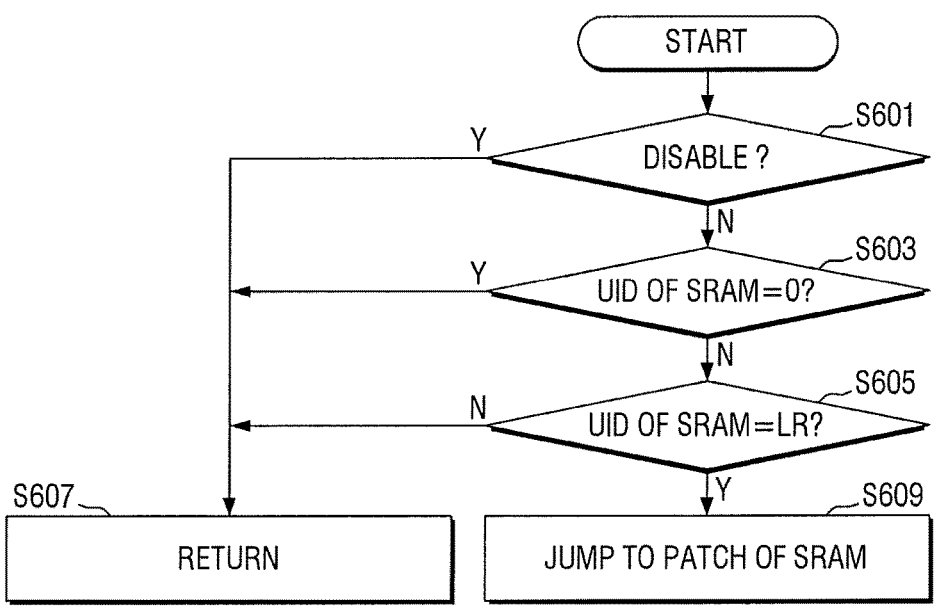
FIG. 6 is a flowchart illustrating a method of operating a semiconductor device according to some embodiments of the present disclosure.

FIG. 6 is a flowchart illustrating a method for operating a semiconductor device according to some embodiments of the present disclosure.

Referring to FIG. 6, a method for operating a semiconductor device according to an embodiment of the present disclosure may include the following steps.

In this embodiment, steps S601 to S609 represent steps following the initialization steps.

In this embodiment, the capital letter S, represents the term step, for example S601 represents step 601. Also, the letters Y and N represent 'Yes' and 'No' answers to the decision steps respectively.

At step S601, it is determined whether to use the patch code execution function for executing the patch code in a semiconductor system. If it is set to disable the patch code execution function in the semiconductor system 1 (Y in S601), the process returns (S609).

Alternatively, if it is set to enable the patch code execution function in the semiconductor system 1 (N in S601), it is determined in step S603 whether the unique ID of the SRAM 30 is '0', or whether it is set to some value other than '0'. If the unique ID corresponds to '0' (Y in S603), the process returns (S609).

In the present embodiment, for simplicity of description, '0' is recorded as the unique ID in order to cause the patch code to not be executed; however the scope of the present disclosure is not limited thereto. It is apparent to those of ordinary skill in the art that the value corresponding to non-execution can be changed to a predetermined value other than '0', for example, '1', or some other value.

On the other hand, if the unique ID of the SRAM does not correspond to '0' (N in S603), it is determined at step S605 whether the unique ID of the SRAM 30 is identical to the LR address 60.

If the unique ID of the SRAM 30 is different than the LR address 60 (N in S605), the process returns (S607).

On the other hand, if the unique ID of the SRAM 30 is identical to the LR address 60 (Y in S605), then the patch code stored in the SRAM 30 is executed (S609).

Furthermore, a method for operating a semiconductor device according to an embodiment of the present disclosure may include providing a nonvolatile memory storing a patch code including a unique ID, and providing an IROM storing a boot code. In this embodiment, the boot code may include a patch code execution function for executing the patch code and an LR address for specifying a location where the patch code is to be executed and run.

This embodiment may further include providing an SRAM storing a copy of the patch code. Here, the copy of the patch code may include a unique ID.

The method may further include comparing the unique ID of the patch code stored in the nonvolatile memory with the LR address provided from the boot code when the patch code execution function is executed, and executing the patch code stored in the SRAM according to the comparison result.

In summary, it is first determined whether the disable function calls for use and operation of a patch code. If disabled, the program returns. If not disabled then it is determined whether the unique ID of the SRAM is a predetermined value such as '0'. If the unique ID is '0' then the program returns. If not disabled, then it is determined whether the unique ID of the SRAM is identical to the LR address. If identical, operation jumps to the patch code of the SRAM. If not identical then program operation returns.

According to various embodiments of the present disclosure, the patch code is executed to prevent a failure due to a defect in the boot code without directly modifying the IROM 20. Particularly, according to the embodiments of the present disclosure, it is possible to execute the patch code capable of performing any of number of operations desired by the user, while maintaining relative simplicity in the complexity of the boot code. Thus, it is possible to conserve time and cost while solving a problem present within the boot code of the IROM.

While the present disclosure has been particularly illustrated, and described with reference to example embodiments thereof, it will be understood by those of ordinary skill in the art that various changes in form and detail may be made to the present embodiments without departing from the spirit and scope of the present disclosure as defined by the following claims. The example embodiments should be considered in a descriptive sense only and not for purposes of limitation.

What is claimed is:

1. A semiconductor system comprising:
   a nonvolatile memory storing a patch code, the patch code comprising a unique identifier (ID);
   an internal read only memory (IROM) storing a boot code, the boot code comprising a patch code execution function for executing the patch code and a linked register (LR) address which is a return address for returning after executing the patch code execution function;
   a static random access memory (SRAM) storing a copy of the patch code, the copy of the patch code including the unique ID; and
   a processor executing the copy of the patch code,
   wherein the patch code execution function compares the unique ID of the patch code stored in the nonvolatile memory with the LR address provided from the boot code when the patch code execution function is executed, and
   wherein the processor executes the copy of the patch code stored in the SRAM according to the comparison result.

2. The semiconductor system of claim 1, wherein the nonvolatile memory stores the patch code as itself.

3. The semiconductor system of claim 1, wherein the nonvolatile memory comprises a one-time programmable (OTP) memory.

4. The semiconductor system of claim 3, wherein the patch code is programmed into the nonvolatile memory comprising the OTP memory.

5. The semiconductor system of claim 1, wherein the patch code stored in the nonvolatile memory is copied to the SRAM during a booting operation of the semiconductor system.

6. The semiconductor system of claim 1, wherein the processor does not execute the patch code if the unique ID of the copy of the patch code stored in the SRAM is a predetermined value.

7. The semiconductor system of claim 1, wherein the processor executes the patch code if the unique ID of the copy of the patch code stored in the SRAM is same as the LR address provided from the boot code.

8. The semiconductor system of claim 1, wherein the processor does not execute the patch code if the unique ID of the copy of the patch code stored in the SRAM is different than the LR address provided from the boot code.

9. A semiconductor system comprising:
 a nonvolatile memory storing a patch code, the patch code comprising a unique identifier (ID);
 an internal read only memory (IROM) storing a boot code, the boot code comprising a patch code execution function for executing the patch code and a linked register (LR) address which is a return address for returning after executing the patch code execution function; and
 a processor,
 wherein the patch code execution function compares the unique ID of the patch code stored in the nonvolatile memory with the LR address provided from the boot code when the patch code execution function is executed, and
 wherein the processor executes the patch code according to the comparison result.

10. The semiconductor system of claim 9, wherein the nonvolatile memory stores the patch code as itself.

11. The semiconductor system of claim 9, wherein the nonvolatile memory comprises a one-time programmable (OTP) memory.

12. The semiconductor system of claim 11, wherein the patch code is programmed into the nonvolatile memory comprising the OTP memory.

13. The semiconductor system of claim 9, wherein the processor does not execute the patch code if the unique ID of the patch code is a '0'.

14. The semiconductor system of claim 9, wherein the processor executes the patch code if the unique ID of the patch code same as the LR address of the patch code execution function.

15. The semiconductor system of claim 9, wherein the processor does not execute the patch code if the unique ID of the patch code is different than the LR address of the patch code execution function.

16. A method for operating a semiconductor system, the method comprising:
 providing a nonvolatile memory storing a patch code comprising a unique identifier (ID);
 providing an internal read only memory (IROM) storing a boot code, the boot code comprising a patch code execution function for executing the patch code and a linked register (LR) address which is a return address for returning after executing the patch code execution function;
 providing a static random access memory (SRAM) storing a copy of the patch code, the copy of the patch code including the unique ID;
 comparing the unique ID of the patch code stored in the nonvolatile memory with the LR address provided from the boot code when the patch code execution function is executed; and
 executing the copy of the patch code stored in the SRAM according to the comparison result.

17. The method of claim 16, wherein the patch code stored in the nonvolatile memory is copied to the SRAM during a booting operation of the semiconductor system.

18. The method of claim 16, wherein the patch code is not executed if the unique ID of the copy of the patch code stored in the SRAM is a predetermined value.

19. The method of claim 16, wherein the patch code is executed if the unique ID of the copy of the patch code stored in the SRAM is same as the LR address provided from the boot code.

20. The method of claim 16, wherein the patch code is not executed if the unique ID of the copy of the patch code stored in the SRAM is different than the LR address provided from the boot code.

* * * * *